3,052,561
PAPER COATING COMPOSITIONS CONTAINING CATIONIC STARCH
Jerome Kronfeld, Plainfield, N.J., assignor to National Starch and Chemical Corporation, New York, N.Y., a corporation of Delaware
No Drawing. Filed Aug. 10, 1959, Ser. No. 832,482
5 Claims. (Cl. 106—213)

This invention relates to an improved paper coating composition. More particularly, it relates to a composition containing a cationic starch derivative as an essential ingredient.

It is my object to provide coating compositions which will permit a reduction in the solids content of the compositions without deterioration in flow characteristics, and also to provide coatings of notably increased strength.

It is well known that paper is ordinarily coated, in order to improve its receptivity to printing, its optical characteristics, appearance, and to achieve other desired properties. The two main elements of a paper coating composition are a pigment (such as clay) and a binder (such as starch or a synthetic resin) which serves to bind the pigment and to adhere the coating to the paper surface. It is also well known that a paper coating composition must have certain characteristics in order to perform its function; thus, it must have the proper viscosity and rheological characteristics to permit its application to the paper by modern high-speed machines and to spread properly on the paper. Its binder must be such that the coating will be strong, homogeneous, and powerfully bound to the paper surface, so that the surface of the paper is definitely strengthened, as measured by the conventional paper surface strength tests used in the industry, as for example the pick test.

There has been a recent tendency in the publishing industry toward the use of paper with reduced basis weight, that is, paper which in its final, coated form weighs less per given area. This is partly due to the need for reducing postage costs of large-circulation periodicals. Since the clay, or equivalent pigment, in coating compositions is one of the chief factors in increasing the weight of papers, it obviously would be desirable to be able to reduce the amount of clay used in such coatings. However, it has not heretofore been possible to do this without a concomitant reduction in the viscosity of the coating composition. This adversely affected the rheological characteristics of the coating, and permitted excessive penetration of the coating into the paper. The strength of the coating, and the resultant coated surface, also suffered.

I have now discovered a means whereby the solids content (and more particularly the clay content) of coating compositions can be lowered, and the basis weight of the coated paper thus reduced, while at the same time retaining the desired viscosity and actually achieving a notable increase in coating strength, as determined by pick test.

The essence of my invention comprises the use, as the binder in paper coating compositions, of a starch derivative containing cationic substituent groups, that is, chemical groups which serve to introduce a positive electric charge in the starch molecule. I have found that this cationic starch derivative may be used in partial or complete replacement of the ordinary starch commonly used as the binder. It may also be used in conjunction with (or in complete replacement of) other binders, such for example as synthetic resins, latices, and the like.

Cationic starch derivatives may be made, for example, by reacting starch, ordinarily through an etherification or esterification reaction, with any reagent which will introduce into the starch a cationic group containing nitrogen, sulfur or phosphorus. Examples of such groups are the amine (primary, secondary, tertiary or quaternary), sulfonium and phosphonium groups. My preferred cationic starch derivative is the tertiary amino alkyl ether resulting from the reaction of starch, under alkaline conditions, with a dialkyl amino alkyl epoxide or dialkyl amino alkyl halide, or the corresponding compounds containing aryl groups in addition to the alkyl groups. The production of such products is described in U.S. Patent 2,813,093, issued November 12, 1957.

Although I prefer the tertiary amino alkyl ethers of starch, the primary and secondary amine deivatives may also be used, as well as the corresponding starch esters. Thus, beside the reagents already named, one may react starch with amino alkyl anhydrides, alkyl imines, amino alkyl epoxides, amino alkyl halides, alkyl amino alkyl epoxides (or halides), amino alkyl sulfates, and the corresponding compounds containing aryl in addition to alkyl groups. As pointed out previously, the sulphonium and phosphonium derivatives of starch are also cationic in property and therefore suitable for the purposes of my invention. The preparation of sulfonium derivatives of starch is described in U.S. Patent No. 2,989,520, issued June 20, 1961, and involves essentially the reaction of starch, in an aqueous alkaline medium, with a beta-halogeno alkyl sulfonium salt, vinyl sulfonium salt or epoxy alkyl sulfonium salt. Other suitable starch derivatives will be apparent to the practitioner, since my invention may employ any starch derivative which has been rendered cationic by the introduction of an electrically positively charged moiety into the starch molecule.

Returning now to the class of cationic starch derivatives containing amine groups, the following are some representative reagents which may be reacted with starch to result in such derivatives: ethylene imine; propylene imine; isatoic anhydride; quinolinic anhydride; beta diethyl amino ethyl chloride; beta dimethyl amino isopropyl chloride; beta dimethyl amino ethyl chloride; 3-diethyl amino 1,2-epoxypropane; 3-dibutyl amino 1,2-epoxypropane; 2-bromo-5-diethyl amino pentane hydrobromide; N-(2,3-epoxypropyl)piperidine; N,N-(2,3-epoxypropyl)methyl aniline. The various halides (e.g. chloro-, bromo-, etc.) can be used interchangeably. In the above reagents, where the free amines have been indicated (e.g., beta diethyl amino ethyl chloride), one can also use the hydrochloride or other salts of these reagents (e.g., beta diethyl amino ethyl chloride hydrochloride). In fact, it is ordinarily preferred to use the salts since these tend to be less toxic and more easily handled. The hydrochloride moiety takes no part in the reaction with the starch. It will be seen that beside the alkyl, aryl and aralkyl types, the reagents may also include those containing cyclic groups. Therefore, when reference is made herein to the alkyl, aryl or aralkyl groups, it will be understood that these cyclic reagents are equivalents of those types. It should also be mentioned that the starch-amine products may be subsequently treated by known methods, so as to result in the quaternary ammonium salt, or such a quaternary ammonium salt may be made directly from raw starch by treating it with the reaction product of an epihalohydrin and a tertiary amine or tertiary amine salt. In either case the resulting starch derivative is of course also cationic, and suitable for my invention.

The term "starch" includes any amylaceous substance such as untreated starch, as well as starch which has been treated by chemical or other means to produce oxidized, dextrinized, hydrolyzed, esterified or etherified derivatives of starch, so long as the product is still essentially amylaceous in nature and still contains hydroxyl groups capable of reacting with reagents serving to introduce cationic groups. The starches may be derived from any plant sources, including corn, waxy maize, sorghum, tapioca, potato, wheat, rice and sago.

It is well known that starch in its natural state exists in the form of discrete granules, which in the presence of water and heat or certain chemicals (such as strong alkalis) undergo gelatinization. The phenomenon of gelatinization involves the swelling, rupture and disintegration of the starch granules, so that they disperse in water to form a homogeneous hydrated colloidal dispersion. Starch which has been thus gelatinized and dried, will, upon subsequent mixing with water, disperse without the aid of heat. On the other hand, ungelatinized starch will quickly settle out of a water suspension, unless sufficient heat is applied to gelatinize and disperse the granules (this is referred to as "cooking" the starch, to form a useable dispersion). The cationic starch derivatives may be prepared in either the ungelatinized or gelatinized form, and both are suitable for my invention. In order to produce the starch derivatives in ungelatinized form, it is of course necessary to avoid those conditions of heat or alkalinity during the reaction which will cause the starch to gelatinize, or, alternatively, to add a known gelatinization retarder such as sodium sulfate to the reaction mass. A product thus made can be filtered and washed, since it is in the original granule form. On the other hand, a gelatinized starch derivative may be made by permitting gelatinization of the reaction mass, by using sufficient heat and/or alkali. This gelatinized mass may, if desired, be dried as by passing over heated drums. Alternatively, the starch derivative may be made in ungelatinized form, filtered and washed if desired, resuspended in water and passed over drums heated sufficiently so as to gelatinize and dry the starch product, which will then be in the so-called cold water soluble form.

As stated, the cationic starch may be used in paper coating compositions in addition to the conventional binder, or in partial or complete replacement thereof. The cationic starch having a positive charge, and the clay and paper fiber having a negative charge, one obtains more than a mere admixture, but rather an electrochemically bound reaction product. It would have been expected that because of this difference in electric charge, the cationic starch would cause the clay to agglomerate and perhaps even coagulate out of the composition. In fact, this does happen when the starch is too highly substituted with cationic groups, but the surprising finding is that when the cationic starch is one where the number of substituent cationic groups is no more than one per ten anhydroglucose units of the starch, then the resultant starch-clay composition is stable, homogeneous and notably effective.

The preparation of paper coating compositions is well known and needs no amplification here. In general, it involves the making of the "clay slip," which is merely a mixture of coating-grade clay in water, with a dispersing agent such as sodium hexametaphosphate and an alkaline material such as sodium hydroxide. The latter two function to give the optimum dispersion of the clay. To this "clay slip" is added the starch or other binder. If the starch is in ungelatinized form, as is customarily the case, it is first "cooked" in water, that is, heated to a temperature beyond the gelatinization point of the starch, and this starch cook is then added, with agitation, to the clay slip. If the starch is a pregelatinized, cold water soluble type, it can be dispersed in cold water, and the dispersion added to the clay slip, or less preferably, the dry cold water soluble starch may be added directly to the clay slip and dispersed by sufficient stirring. The proportions of the various ingredients of the coating composition will naturally be subject to much variance, depending upon the particular type of clay and binder employed, the method of applying the coating, the properties desired in the final coated product, etc. However, in general, the clay slip may contain from about 20% to 75%, by weight, of clay and about 0.3% of sodium hexametaphosphate or other dispersing agent, based on the weight of the clay. The pH should preferably be from 8.0 to 9.0, for optimum dispersion of the clay. The starch cook ordinarily has a starch solids content of from 5% to 40%. When the starch is mixed with the clay slip, the amounts of the components in the final coating composition should ordinarily fall within the following weight ranges: Clay 10% to 60%, starch 5% to 15%, water 30% to 80% (the total being 100%).

The cationic starch derivative may be used in any desired proportion to replace part or all of the standard starch binder. If in ungelatinized form, it is first cooked in the manner already described, before adding to the clay slip. In general, I have found it advisable to employ at least 3% by weight of the cationic starch, based on the clay, in order to achieve the already discussed improvements in strength and viscosity. My preferred amount of cationic starch derivative is from 3% to 20% based on the weight of the clay. In the lower areas of this range, the cationic starch would be used together with another binder, such as ordinary starch (whether raw, or converted by enzymes, or otherwise), or resins. As one uses larger amounts of the cationic starch one approaches a point where it is found that no other binder is necessary.

The following examples will illustrate the embodiment of my invention. All parts given are by weight, unless otherwise specified.

*Example I*

100 parts of dry coating clay were mixed with 43 parts of water containing 0.3 part of sodium hexametaphosphate. When the clay was uniformly dispersed, there was added, with agitation, a dispersion made by heating 13 parts of a cationic starch in 40 parts of water for 20 minutes at 195° F. The cationic starch in this case was one containing a sulfonium group, and had been made by reacting 75 fluidity acid-converted corn starch, in an aqueous alkaline medium, with 7%, based on the starch weight, of chlorethyl methyl ethyl sulfonium iodide.

A series of tests were then conducted with this coating composition, as follows:

*Water retention.*—A sample of the coating composition (i.e., the "coating color") was placed in a watch glass. A strip of uncoated paper (the "base stock"), was stained on the wire side with potassium permanganate (or other water sensitive dye-indicator). The thus-stained paper was placed felt-side down on the coating color in the watch glass. A record was kept of the time, in seconds, required for the stain on the upper surface of the paper to react with the water transmitted from the coating color through the paper. This figure was reported as "water retention." Water retention, as reported in seconds, is a comparative value relating to the ability of a coating to hold on to its water of formulation, and is proportional to the resistance of the coating to release of this water into the paper stock. Ordinarily, the higher the water retention, the better the coating, and a high water retention figure is believed to reflect itself in improved smoothness, strength and print quality of the coated sheets.

In the case of the coating of this example, the water retention figure was 33 seconds, whereas the same test conducted with a coating composition made in the same way, except that the starch used was a 75 fluidity corn starch without sulfonium groups, gave a water retention figure of only 15 seconds.

*Wax pick test.*—The coating composition was applied to the same quality paper stock, to a thickness of ½ mil (wet). Samples of the coated stock were dried at 105° C. for one minute. Wax picks were taken from the dried samples, according to the procedure detailed in Standard Procedure No. T-459m48 of the Technical Association of the Pulp and Paper Industry. In the case of the coating of this example, the wax pick was 7, whereas the coating made with a similar starch, but containing no cationic sulfonium group, gave a wax pick of 3. The wax pick, of course, is a measure of the strength of a coating, and the improvement attained by the use of the cationic starch is self-evident.

*Viscosity.*—When a cooked aqueous dispersion of an ordinary starch is compared with a similar dispersion of the corresponding starch which had been modified by the insertion of cationic groups, no substantial difference is noted in the viscosity of the two dispersions. Yet, when each of the starch dispersions is added to a suspended clay pigment, the cationic starch results in a considerably higher viscosity. When the coating color of this example was tested in a Brookfield viscometer ("RVF" model), at 20 r.p.m. at 110° F., it was found to have a viscosity of 30,000 centipoises. The same coating color, made with the corresponding starch containing no cationic groups, gave a viscosity figure of only 3,000 cps.

The above example was repeated, except that the starch, instead of being a sulfonium derivative, was the product resulting from the reaction of corn starch, in an aqueous alkaline medium, with 5% (based on the weight of the starch) of ethylene imine. When the coating was tested in the manner described above, the water retention was found to be 25 seconds, the wax pick 7, and the viscosity 9200 cps. As is seen, all of these figures represent a considerable improvement over the coating composition made with ordinary starch.

*Example II*

In this example, comparison was made among an ordinary, non-cationic corn starch (which had been preconverted by acid to a degree known in the trade as 75 fluidity, to achieve a workable viscosity), a 75 fluidity corn starch which had been reacted in aqueous alkaline medium with 6% (based on the weight of the starch) of diethyl amino ethyl chloride, resulting in the introduction into the starch of a cationic, tertiary amine group, and thirdly a mixture of 80% by weight of the untreated 75 fluidity starch and 20% of the cationic starch.

*Viscosity.*—A non-dispersed coating clay (82% under 2 micron particle size) was mixed in water containing 0.25% hexametaphosphate and 0.1% sodium hydroxide, based on the weight of the clay. The amount of water was such as to yield a clay slip of 70% anhydrous solids. Separately, each of the starches (the 75 fluidity, the cationic 75 fluidity, and the mixture of the two), was cooked in water at 195° F. in a jacketed kettle, with mechanical agitation, for 20 minutes. Each of the starch cooks was then added to a sample of the clay slip, with agitation. In this particular experiment, the amount of starch was 15%, by weight of the clay in the formulation.

Using a Brookfield viscometer, at 20 r.p.m. and 110° F., we then checked the viscosity of the coatings at different solids contents (that is, coatings containing different amounts of water, but with a constant proportion of 15% starch on the clay). The following data was obtained:

| Percent Solids in Coating Composition | Non-Cationic Starch | Cationic Starch | 80% Non-Cationic, 20% Cationic |
|---|---|---|---|
| 50 | 1,000 | 5,000 | 4,000 |
| 52 | 2,000 | 8,500 | 7,000 |
| 54 | 2,400 | 13,500 | 9,900 |
| 56 | 3,000 | 19,800 | 14,800 |
| 58 | 4,000 | 33,000 | 23,000 |

It is seen from the above what a vast difference in viscosity is achieved by the use of a cationic starch, even as a partial replacement for the ordinary starches. Thus, for given viscosity, say 4000, it was necessary to use the non-cationic starch in a coating composition at 58% solids, but when 20% of the starch was replaced by a cationic starch, the same viscosity was obtained with a coating composition of only 50% solids. The lessening in the amount of clay deposited on the paper, and therefore the lightening of the basis weight of the paper, is self-evident.

*Water retention.*—Using the same three starches as shown above (non-cationic, cationic, and mixture of the two) a number of coating colors were prepared, in which the percent of starch based on the weight of clay varied, being 11% in one set of samples, and 13, 15, 17 and 19%, respectively, in others. These various samples were then tested for water retention, in the manner already described. The data follows:

| Percent Starch on Clay | Water Retention (Seconds) | | |
|---|---|---|---|
| | Non-Cationic Starch | Cationic Starch | 80% Non-Cationic 20% Cationic |
| 11 | 18 | 25.5 | 19 |
| 13 | 18.5 | 35 | 22 |
| 15 | 20 | 42.5 | 24 |
| 17 | 21.5 | 48 | 26 |
| 19 | 22.5 | 52.5 | 28 |

It is seen that with increasing proportions of starch, based on the clay in the coating composition, the non-cationic starch offers very little improvement in water retention, rising from 18 seconds at 11% to only 22.5 seconds at 19%. A partial replacement of the conventional starch with the cationic starch offers a better series of values for water retention, but the most dramatic increase is seen in the case of cationic starch, where water retention is 25.5 seconds at 11%, and at 19% it has more than doubled, going to 52.5%.

*Pick resistance.*—Using coating compositions containing 50% total solids (i.e. starch and clay), but varying the ratio of starch to clay, I tested for pick resistance, following the previously mentioned TAPPI procedure. The data follow:

| Percent Starch on Clay | Pick | | |
|---|---|---|---|
| | Non-Cationic Starch | Cationic Starch | 80% Non-Cationic 20% Cationic |
| 11 | 3.5 | 5.5 | 3.8 |
| 13 | 4.7 | 7.5 | 5.1 |
| 15 | 5.8 | 8.8 | 6.3 |
| 17 | 7.0 | 10.0 | 7.5 |
| 19 | 8.1 | 11.0 | 8.8 |

In a variation of the above pick tests, I conducted a series wherein the viscosity of the coating compositions was kept constant, at 5,000 cps., and the ratio of starch to clay was varied. In order to achieve constant viscosity, there was of course a difference in the solids content of the various samples, since as more cationic starch was added the viscosity increased, and could only be brought to the predetermined constant level by lowering of solids (addition of water). Thus, the solids of the coating compositions in the following table made with conventional, non-cationic starch, ranged from 57% to 62%, while the solids of the corresponding compositions made with the cationic starch ranged from 48% to 52%. The pick values follow:

| Percent Starch on Clay | Pick | |
|---|---|---|
| | Non-Cationic Starch (Aver. Solids 57–62%) | Cationic Starch (Aver. Solids 48–52%) |
| 11 | 4.7 | 5.5 |
| 13 | 5.8 | 7.0 |
| 15 | 6.8 | 8.5 |
| 17 | 7.8 | 10.4 |
| 19 | 8.8 | 11.8 |

It is of real significance that, at a given level of binder (e.g. starch), based on the clay, and at a given viscosity, one may by using the cationic starch obtain a wax pick two or three points higher than with the composition made with conventional binder, even though the coating composition containing the cationic starch is approximately 10% lower in solids.

In place of the coating compositions made with starch which had been treated with 6% of the diethyl amino ethyl chloride, I prepared and tested compositions using starch which had been treated with as little as 1% of the reagent. I also used cationic starches made by reacting a chlorinated starch, and in another case an enzyme converted starch, with the aforesaid amino compound. Still another cationic starch was made by reacting a raw, untreated starch with the amino compound. In still other variations I used in the above example, in place of the cationic starch therein shown, one which had been made by reacting starch with a bromo-5-diethyl amino pentane hydrobromide; in another case I used a quaternary starch derivative which had been made by taking the reaction product of starch and beta diethyl amino ethyl chloride hydrochloride, suspending 20 parts by weight of the product in 100 parts ethanol containing 10 parts methyl iodide, and heating at reflux, thus forming the quaternary ammonium salt of the starch derivative. In all of these cases, tests of the resulting coating compositions on paper stock indicated improvements of the magnitude already detailed, with regard to viscosity increase, water retention and strength (pick).

An extremely important fact in connection with my invention is that the use of cationic starches in paper coating compositions not only brings about the herein described improvements, but does so without in any way impairing the rheological characteristics of the coating compositions. Their machine operation remains excellent.

Variations in materials, proportions and procedures will be apparent to the practitioner, without departing from the scope of the invention, which is limited only by the following claims.

I claim:
1. A paper coating composition consisting essentially, by weight, of 30%–80% water, 10%–60% pigment and 5%–15% of a starch binder the total being 100%, at least a portion of said binder being a cationic starch selected from the group consisting of starch ethers and starch esters containing substituents selected from the group consisting of primary, secondary, tertiary and quaternary amine groups, sulfonium groups and phosphonium groups, the amount of said cationic starch being at least 3% based on the weight of the pigment, the number of substituent groups in said cationic starch being no greater than one per ten anhydroglucose units of the starch.

2. The paper coating composition of claim 1 in which the cationic starch is the tertiary amino alkyl ether of starch.

3. A paper coating composition consisting essentially, by weight, of 30%–80% water, 10%–60% clay and 5%–15% of a starch binder the total being 100%, at least a portion of said binder, in the amount of at least 3% by weight of the clay, being a cationic starch selected from the group consisting of starch ethers and starch esters containing substituents selected from the group consisting of primary, secondary, tertiary and quaternary amine groups, sulfonium groups and phosphonium groups, the number of substituent groups in said cationic starch being no greater than one per ten anhydroglcose units of the starch.

4. A paper coating composition consisting essentially, by weight, of 30%–80% water, 10%–60% clay and 5%–15% of a cationic starch selected from the group consisting of starch ethers and starch esters containing substituent groups selected from the group consisting of primary, secondary, tertiary and quaternary amine groups, sulfonium groups and phosphonium groups, the total being 100% and the amount of said cationic starch being at least 3% based on the weight of the clay, the number of substituent groups in said cationic starch being no greater than one per ten anhydroglucose units of the starch.

5. Paper coated with a dried composition, said composition before drying consisting essentially, by weight, of 30%–80% water 10%–60% clay and 5%–15% of a starch binder for said clay, at least a portion of said binder being a cationic starch selected from the group consisting of starch ethers and starch esters containing substituent groups selected from the group consisting of primary, secondary, tetirary and quaternary amine groups, sulfonium groups and phosphonium groups, and the amount of said cationic starch being at least 3% based on the weight of the clay, the number of substituent groups in said cationic starch being no greater than one per ten anhydroglucose units of the starch.

References Cited in the file of this patent
UNITED STATES PATENTS

| 2,700,621 | Schwalbe et al. | Jan. 25, 1955 |
| 2,813,093 | Caldwell | Nov. 12, 1957 |